(12) United States Patent
Corrado et al.

(10) Patent No.: US 7,646,609 B2
(45) Date of Patent: Jan. 12, 2010

(54) METHOD AND APPARATUS FOR ACHIEVING RIGID ATTACHMENTS FOR COMPUTER COMPONENTS

(75) Inventors: Joseph P. Corrado, Marlboro, NY (US); Michael J. Fisher, Poughkeepsie, NY (US); Gerald P. Monaco, Stanfordville, NY (US); Budy D. Notohardjono, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 11/407,020

(22) Filed: Apr. 19, 2006

(65) Prior Publication Data

US 2007/0249211 A1    Oct. 25, 2007

(51) Int. Cl.
*H05K 7/12* (2006.01)
(52) U.S. Cl. .................. 361/740; 361/726; 361/747; 361/732
(58) Field of Classification Search .............. 361/747, 361/759, 801, 740, 732, 726
See application file for complete search history.

(56) References Cited

U.S. PATENT DOCUMENTS

| 4,480,287 | A | * | 10/1984 | Jensen | 361/707 |
| 4,824,303 | A | * | 4/1989 | Dinger | 411/79 |
| 5,262,588 | A | * | 11/1993 | Gallagher | 174/374 |
| 5,779,388 | A | * | 7/1998 | Yamamoto | 403/374.1 |
| 6,246,582 | B1 | * | 6/2001 | Habing et al. | 361/704 |
| 6,249,936 | B1 | * | 6/2001 | Webster | 24/569 |
| 6,687,130 | B2 | * | 2/2004 | Adams et al. | 361/740 |
| 6,707,670 | B2 | * | 3/2004 | Seal | 361/704 |
| 7,031,167 | B1 | * | 4/2006 | Zagoory et al. | 361/759 |

* cited by examiner

*Primary Examiner*—Dameon E Levi
(74) *Attorney, Agent, or Firm*—Geraldine D. Monteleone; Lily Neff

(57) ABSTRACT

A method and apparatus used for actuation is provided. In one embodiment, the apparatus comprises an actuation body having a gradually tapered wider end received at one end by an expandable member and at an opposing end by a drive shell. The actuation body being movable from a first position to a second position by means of the drive shell such that this movement causes a looser or tighter fit at the wider end with respect to the expandable member.

18 Claims, 4 Drawing Sheets

METHOD AND APPARATUS FOR ACHIEVING RIGID ATTACHMENTS FOR COMPUTER COMPONENTS

BACKGROUND OF THE INVENTION

1. Field of the Invention

This invention relates to a method and apparatus an actuation mechanism and more particularly to a method and apparatus for an actuation mechanism used to form rigid attachments between two surfaces in a computing system environment.

2. Description of Background

Large computing system environments, such as servers computer systems, often are comprised of a number of assemblies. These assemblies can include a variety electronic components, such as daughter cards, logic elements and related elements that support logic entities, and mid-plane boards amongst others. The assemblies are designed such that they can be then inserted into a support rack or support frame.

The support rack or frame often has a cage like structure, with a plurality of vertically extending supports connecting to two or more horizontal rails to one another. Side and rear and/or front structural surfaces can also be optionally added to enhance structural rigidity or to accommodate the thermal interface subassemblies used to cool the computing system environment.

In order to insert the assemblies containing electronic components, the frame is often provided with mating interconnects that receive these assemblies. After they are plugged into their mating interconnects, the assemblies are then fixed, latched or mounted into a position using a number mounting devices to prevent relative movement. Operational vibration and shock as some examples, make it a necessity that these assemblies are mounted to avoid a number of issues such as potential functional problems such as intermittent due to connection wear.

The ability to rigidly attach these assemblies once they are plugged or placed into their mating interconnects, becomes a function of the substructures assembly tolerance as well as the tolerance of the frame and the ability to rigidly span that tolerance with a sufficiently rigid member.

It is undesirable to design mounting means that delivers loading or stresses to the interconnect system as it not only affect the structural integrity of the computing environment but it may potentially lead to performance problems. Similarly, any design does not address unbalanced loading of the frame and substructure is also undesirable for similar reasons.

A number of solutions are provided in the prior art to provide such mounting means. These include a variety of designs implementing springs and other elastic means as part of their incorporated solution. In instances when component mass and insertion forces are small, springs and other elastic mechanism have been successfully implemented by the prior art. Unfortunately, however, when the components and insertion forces are large and the packaging is tight, and the amount of spring deflection is large in order to accommodate the tolerance traditional approaches fall short and problems occur.

The challenge is to rigidly attach large components (such as those over 100 lbs), across large assembly tolerances (such as those that are over 2 mm) with sufficient clamping force and structural integrity to maintain the relative position of the components during exposure to routine shock and vibration testing to avoid any connection wear mechanism or relative motion between the two mating surfaces. Since prior art does not provide a solution, it is consequently desirable to provide a design that provide a solution to the problem.

SUMMARY OF THE INVENTION

The shortcomings of the prior art are overcome and additional advantages are provided through the method and related apparatus used for actuation. In one embodiment, the apparatus comprises an actuation body having a gradually tapered wider end received at one end by an expandable member at a second end by a drive shell. The actuation body being movable from a first position to a second position by means of the drive shell such that this movement causes a looser or tighter fit at the other end with respect to the expandable member. In alternate embodiments, the expandable member includes a rotation guard that selectively limits rotation of the actuation body. In other embodiments, the apparatus can be received by a receiving socket such that they fixably connect a plurality of respective surfaces to one another when the apparatus and the receiving docket are fixably connected to these respective surfaces.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1A:
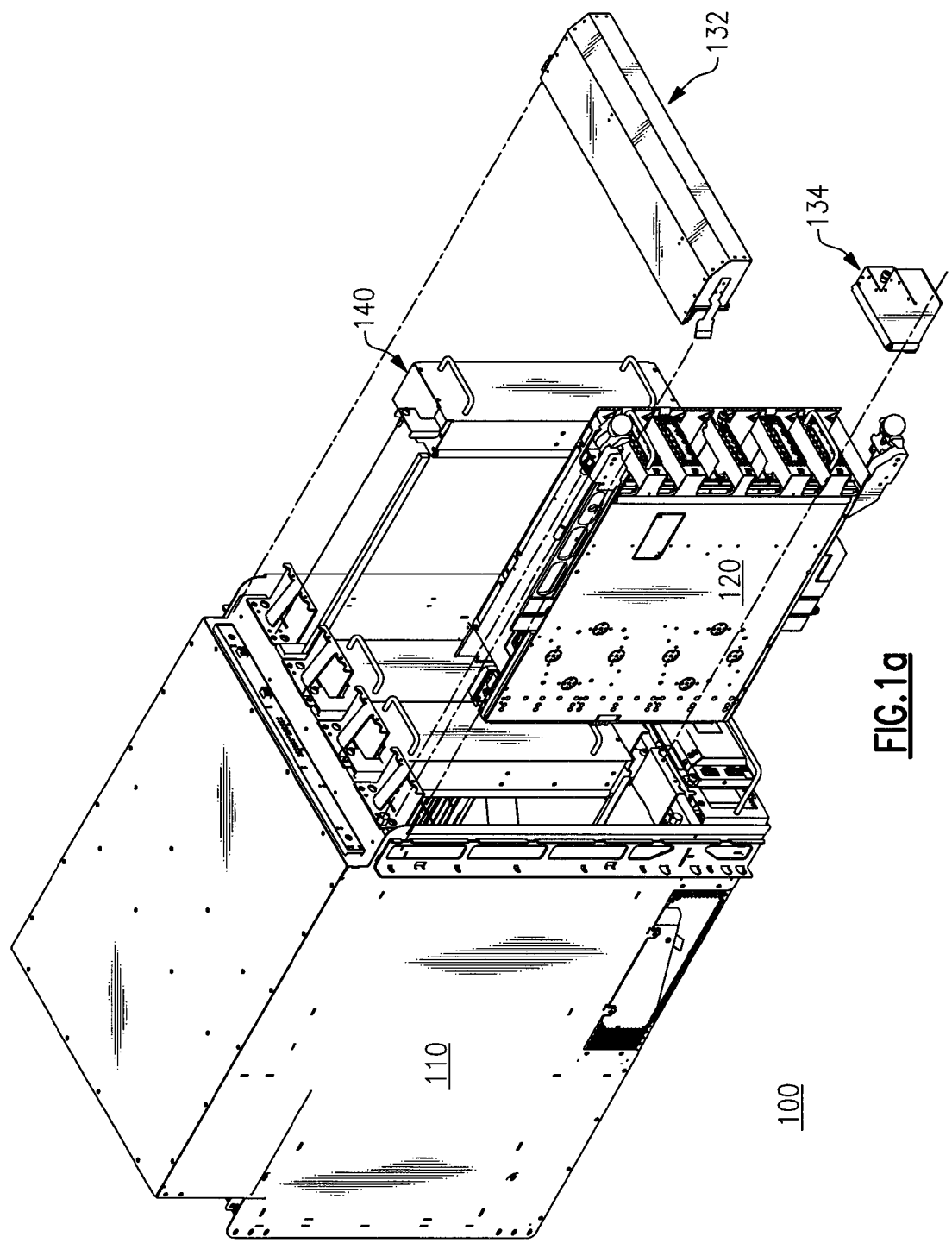
FIGS. 1a and 1b are illustrations of an example of a frame cage chassis housing one or more electronic assemblies in a computing system environment.
Figure 1B:
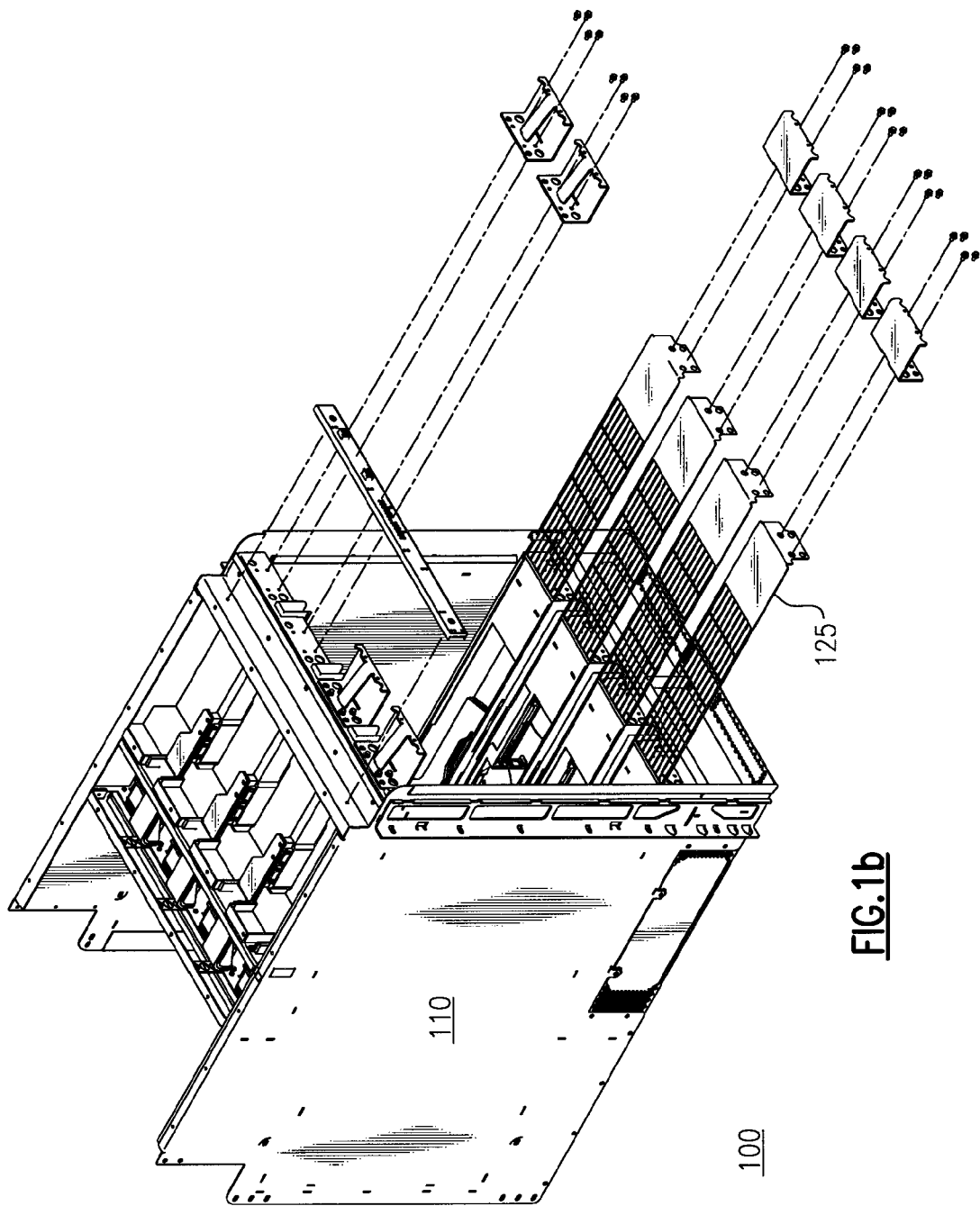

FIGS. 1a and 1b are illustrations of an example of a frame cage chassis housing one or more electronic assemblies in a computing system environment. The example illustrated in FIG. 1a, provides for a front view of a central electronic complex (CEC) 100. The cage like frame is denoted by numerals 110. One of a plurality of assemblies housing one or more electronic components is shown as referenced at 120. The assembly 120 is sometimes referred to as a node assembly. As illustrated by the figure, the assembly 120 is shown prior to being inserted in the frame 110. Some other components are also illustrated in FIG. 1a, such as EMC covers 132 and 134 and node fillers 140. These latter components are not essential to the discussion of the present invention, but are shown as way of example.

FIG. 1b provides an isometric view of the frame 110 previously illustrated in FIG. 1a. While the assembly 120 is not shown in FIG. 1b, however, mating interconnects 125 are illustrated to provide better understanding of the overall design. As discussed, mating interconnects 125 are used to guide and connect he assemblies into the frame 110. The rigid attachment between the assembly and the cage like frame is intended to avoid wear on the mating interconnects 125.

Figure 2:
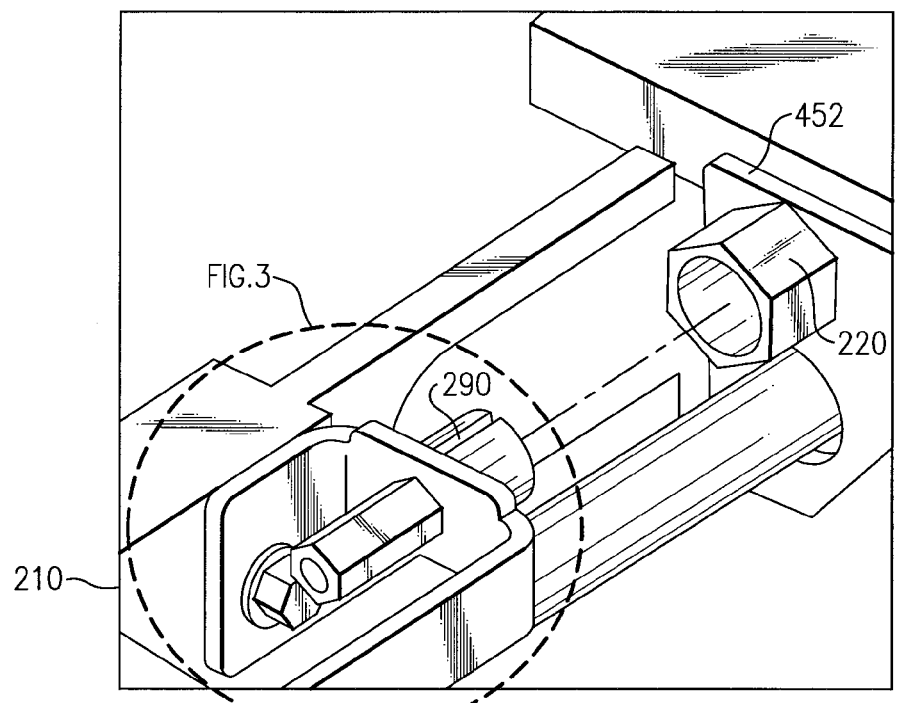
FIGS. 2 and 3 are schematic illustration of one embodiment of the present invention viewed from different angles.
Figure 3:
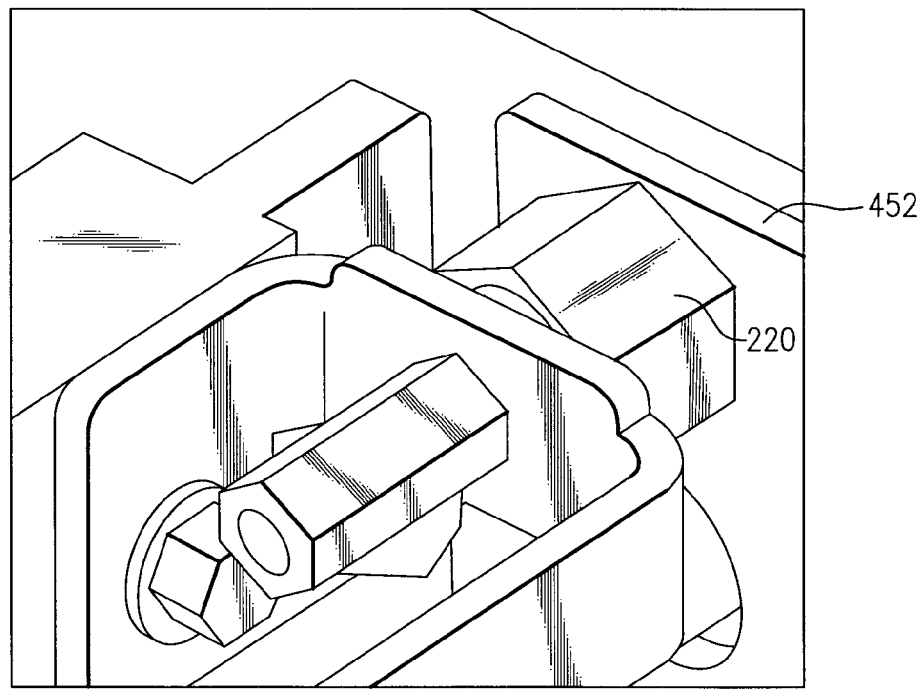
Figure 4:
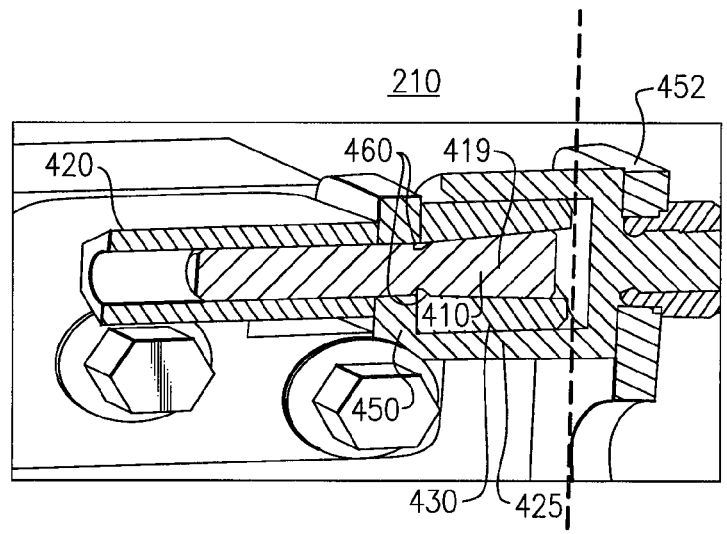
FIG. 4 is a cross sectional illustration providing details of actuation mechanism of embodiments illustrated in FIGS. 2 and 3.

FIGS. 2 and 3 provide different views of an embodiment of the present invention, while FIG. 4 provides a more detailed illustration of the actuation mechanism of FIGS. 2 and 3. In the following discussion, it may be helpful to review FIGS. 2, 3 and 4 from time to time in conjunction with one another to provide a better understanding.

It should be noted that while the present discussion concentrates specifically on the problems left unresolved by the prior art, the workings of the present invention is not limited to providing a solution to these problems. Present invention can be applied to a variety of scenarios where such design provides advantages. Similarly, the following discussion is provided by use of examples that are used in large computing environments. The use of the present invention, however, should not be limited to this field as the following examples are only provided for ease of understanding.

Referring back to FIG. 2, an actuation mechanism 210 is illustrated. A mating counterpart 220 is also illustrated in FIG. 2 for mating with the actuation mechanism 210. The actuation mechanism 210 is shown in an unmated position in FIG. 2.

FIG. 3, provides an alternate view to the same embodiment as provided in FIG. 2. In FIG. 3 the actuation mechanism 210 is illustrated after mating with the mating counterpart 220. The actuation mechanism 210 and the mating counterpart 220, can each be attached to different surfaces. Once joined together, however, they securely and rigidly bring the two respective surfaces together and prevent the mounted surfaces from moving in any one direction (side by side or up and down etc.) during shock and or vibrations.

In one example, the mating counterpart 220 can be mounted on the frame 110 of FIGS. 1a and 1b (or even be part of the mating interconnect 125 in certain environments), while the actuation mechanism 210 can be attached to the assembly 120 as to provide secure fixable connections between the respective units/surfaces.

Once the electronic components 120 are placed in the rack 110, the actuation mechanism 210 engages the mating component 220. While in prior art such tasks do not always ensure a perfect actuation, due to the design of the mechanism suggested in the present invention as discussed, the unique design provides a tight contact between the actuation mechanism 210 and the mating component 220 when fully engaged.

Figure 5:
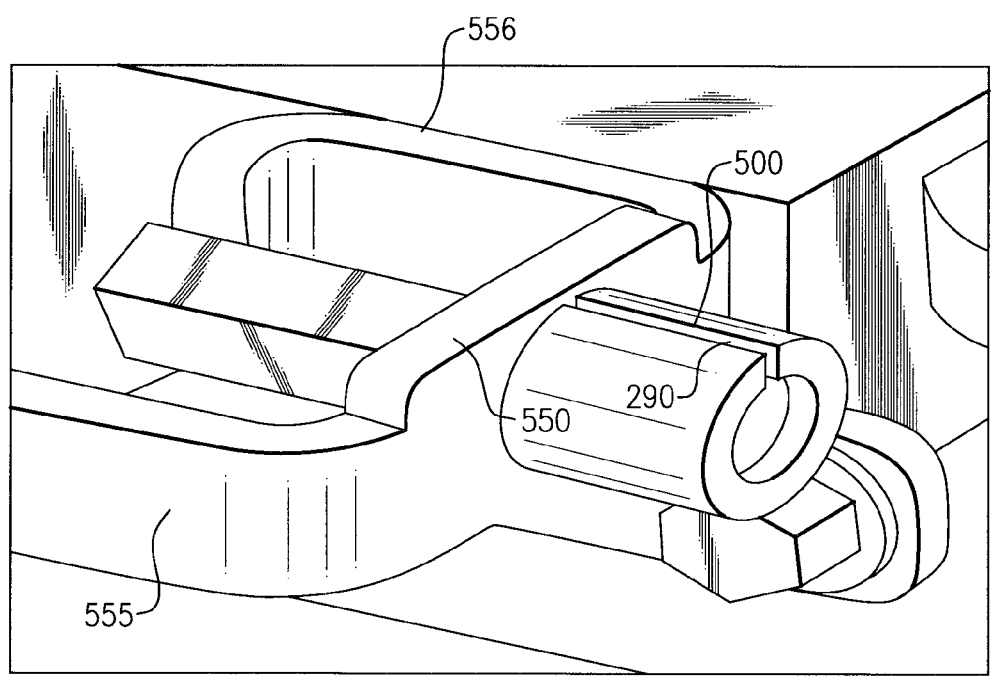
FIG. 5 is a side view illustration of the embodiment presented in FIG. 4.

FIG. 4 is cross sectional illustration of the actuation mechanism 210. By providing a cross sectional cut in FIG. 4, some of the components of the actuation mechanism not visible in the illustrations of FIGS. 2 and 3 can be shown and further explored. FIG. 5 is an alternate view of the embodiments provided in FIGS. 2 through 4 and will be also discussed in conjunction with them as necessary.

In one embodiment of the present invention as shown in FIG. 4, the actuation mechanism 210 is comprised of an actuation body 410, hereinafter interchangeably referenced as main body 410. The actuation or main body 410 is received by a drive shell 420. The actuation body is preferably shaped to have a gradually tapered wider end 419 to provide maximum actuation and engageability as will be discussed below, but alternate embodiments can encompass substituting shapes.

In the example provided by the illustration of FIG. 4, one end of the main body is cone shaped, with the wider portion being placed at the outside of the actuation body 410. As illustrated, in one embodiment, the width then tapers off gradually as it gets toward the middle of the main body 410. The conical shape can provide rotatability in situation where that is preferred but in such situations, it may also be preferred to used a rotation guard as necessary to limit the degree of such rotation.

In the illustrated example of FIG. 4, the main body 410 is a conical wedge drive screw 410 but this is optional and in alternate embodiments other similar arrangements can be used. In this embodiment, as the name implies, the conical wedge screw 410 is capable of being moved to and from a first position to a second position by a receiving drive shell 420 disposed at an opposing end from the coned end 419.

In the example illustrated by FIG. 4, the conical wedge drive screw 410 is partially disposed inside a drive nut 420 that when actuated, in turn moves the conical wedge drive screw 410 from a first to a second position. In this case that means that the conical wedge drive screw 410 is pulled away from or towards an expandable member 430 that is disposed at the other end (the coned end) 419 of conical wedge drive screw 410.

The conical wedge drive screw 410 is received by the expandable member 430 on the coned end 419, in such a way in the example illustrated by FIG. 4, such the member surrounds the conical end 419 of the conical wedge drive screw 410 completely.

The expandable member 430 preferably has an aperture or opening 290 not visible in FIG. 4, but visible in the illustration of FIGS. 2 and 5. The aperture or opening 290 is designed to house a rotation guard discussed earlier (not particularly visible in the figures). The rotation guard, in one embodiment is to make contact with the conical wedge drive screw 410 in order to control and limit its rotation (i. e. side to side). The aperture or opening 290 can be selectively be shaped, ranging an open slit that runs the length of the expandable member 430 at one end of the spectrum to a slight opening at the other end of the spectrum. In other words, the shape and dimensions (width, length and height) of the aperture can be selectively altered to address specific design needs as long as it can accommodate the rotation guard.

In one embodiment of the present invention, a rotation guard is provided in the aperture. Although not visible in FIG. 5, the location of rotation guard inside the aperture is generally illustrated and referenced by numerals 500 in FIG. 5. The rotation guard 500 can be comprised of a variety of structures as known to those skilled in the art. For example, a simple pin, placed in a receiving pin hole can prevent the rotation of the conical wedge drive screw 415 in one embodiment of the present invention. Other embodiments and variations is easily conceivable.

In addition, in the example shown in the embodiment discussed in conjunction with FIG. 4, the expanding member 430 is an expandable split ring. The expandable split ring design is chosen in conjunction with the conical wedge shaped drive screw 410 but the characteristic and shape of the expandable member 430 is obviously selectable depending on the shape of the main body 415 design and other specific needs.

A plurality of support components can also be optionally provided to enhance rigidity of the actuation mechanism and aid in subsequent structural attachments. In the illustrated example of FIG. 4, a first and a second support component are shown and referred to as component A and component B. These components are respectively referenced by numerals 450 and 452.

The first support component 450 (component A) in some embodiments can also serve additional purposes. As illustrated in the embodiment of FIG. 4, the support component 450 is disposed at the narrower (top) end of the core (419). In one embodiment, the support component 450 can help guide the cored end 419 from its first to its second position, with the aid of drive nut 420, such that the movement of the tapered end inside the expanding member 430 provides a tighter or a looser fit.

The shape of the first support component 450 (component A) can be varied. A multitude of designs can be used to accomplish this goal as known by those skilled in the art. For example, the first support component 450 (component A) can be a ring with a hollow center or alternatively shaped in any other shapes with openings such that it is disposed around the actuation body 410. Slight indentations can also be made in areas where actuation body 410 meets the first support component 450 to provide better control and/or structural fit. These slight indentations are shown in FIG. 4 and referenced by numerals 460.

It should also be noted that in one embodiment of the present invention, the first support component (component A) 450 is also fixably attached to the drive nut 420 as illustrated in the example of FIG. 4. This can optionally aid in the enablement of the actuation of the mechanism 210 as will be discussed below in more detail.

In addition, the first support component 450 (component A) can be part of a greater support structure. This is better illustrated by reference to FIG. 5. FIG. 5, provides a view of actuation mechanism 210 rotated in a ninety degree angle.

As illustrated in FIG. 5, the first support component 450 is shown to be comprised of three sections. The first section, as denoted by numerals 550, surrounds the main body 210 (or alternatively portion of the conical wedge drive screw 410). This first section 450 is then connected to an upper and a lower sections 555 and 556 as illustrated in FIG. 5. Although not illustrated in this figure, either of those sections 555 and 556 can also be connected to other sections and other surfaces to desirably enhance rigidity and support for the mechanism as a whole. In alternate embodiments, first support component 450 can also be comprised of more or less sectional areas.

Second support component (component B) is denoted by numerals 452. The purpose of second support component 452 (component B) is to lend support to the mating counterpart 220. In the example of the embodiment discussed in conjunction with FIG. 4, the mating counterpart 220 is preferably a receiving socket as illustrated in the figure. The mating counterpart 220, in the example of FIG. 4, is separately referenced by numerals 425, is attached to the second support component 452 (component B) in FIG. 4. The attachment can be made by a variety of means known to those killed in the art which does not need further discussion here.

Looking at FIGS. 2 through 5 together and as per one embodiment of the present invention actuation mechanism, is engaged in the following manner. The actuation activity commences when the drive nut 420 is first actuated. The actuation of the drive nut 420 in turn leads to activation of the actuation body 410.

As the drive nut 420 is actuated, the actuation body or in this example the conical wedge drive screw 410 is pulled tight. This can in one embodiment be achieved by moving the actuation body 410 from a first position to a second position such that the conical shaped end 419 provides a looser/tighter fit (i.e. the narrower end provides a looser fit than the wider end of the cone.) with respect to the expandable member and ultimately the receiving socket. In this example, this would mean moving the actuation body away or towards the expandable member 430 such that the coned end provides the above mentioned fit.

As the conical wedge screw 410 travels down the core, the outer expanding split ring 430 expands tight against the receiving socket 425 as well. Frictional and hoop stress forces will then maintain a rigid and tight connection between the actuation mechanism 210 and the receiving socket 425. The rotation guard can then be selectively engaged once the actuation body is in its final position to guard against any dimensional movements.

The engagement of the actuation mechanism 210 and its mating counterpart 220 forms a rigid attachment in this way. A wide range of functional operations, in all directions (i.e three dimensionally) supports this rigid attachment as discussed. This arrangement is particularly helpful when dealing with large assembly tolerances in all three dimensional and addresses the previously visited prior art problem.

This is because the screw driven conical wedge 415, is capable of delivering significant clamp forces which are able to withstand large loads in all directions. Another advantage of the suggested mechanism is that it can deliver rigid actuation with close to zero insertion force or pulling force. The actuation mechanism 210 is also kinematically balanced and therefore delivers virtually no imbalanced stress producing loads to the attached substructures.

Some of the other advantages of the actuation mechanism 210 discussed above that may not be immediately recognizable stem from its condensed design. The design is not only compact but also achievable at very little cost. Delivering such maximum performance in a minimum footprint is especially advantageous in the context of computing system environments.

The industry trend, in this area, has been to continuously increase the number of electronic components inside the computing system environments. At the same time there is a push to decrease the overall size of the system environment as a whole. Given the increased number of the components in a shrinking footprint, there is always an advantage to provide solutions that take these issues in consideration.

Beside the advantages discussed above, the present invention provides great benefits when servicing and assembling different parts of the computing system environment. Referring back to the exemplary embodiments discussed, since the receiving socket 425 can be attached to the rack, the actuation mechanism 210 can connect to the receiving socket 425 easily with a simple single point actuation screw in some embodiments.

It should also be noted that in a preferred embodiment of the present invention the actuation mechanism 210 and the receiving socket 425 are both formed of metal or metal components. This is to ensure against issues that may impact electrical integrity due to excessive wear parts. The first and second support 450 and 452 are also comprised of metal or metal components in this preferred embodiment, at least in the areas that are in direct contact with the actuation mechanism 210 or the receiving socket 425.

While the preferred embodiment to the invention has been described, it will be understood that those skilled in the art, both now and in the future, may make various improvements and enhancements which fall within the scope of the claims which follow.

What is claimed is:

1. An apparatus comprising:
   an actuation body having a gradually tapered wider end received at said wider end by an expandable member and at an opposing end by a drive shell;
   a first support component disposed around said actuation body between said wider end and said opposing end of said actuation body; and said actuation body being movable from a first position to a second position by said drive shell such that this movement causes a looser or tighter fit at said wider end with respect to said expandable member.

2. The apparatus of claim 1, wherein said expandable member has an aperture for disposing a rotation guard, said rotation guard being capable of contacting said actuation body and selectively controlling and limiting its rotational movement.

3. The apparatus of claim 1, wherein said wider end is cone shaped.

4. The apparatus of claim 3, wherein said actuation body is a conical wedge drive screw.

5. The apparatus of claim 4, wherein said drive shell is a drive nut.

6. The apparatus of claim 2, wherein said aperture is a slit.

7. The apparatus of claim 6, wherein said expandable member is an expandable ring.

8. The apparatus of claim 7, wherein said expandable ring is an expandable split ring, with said slit providing separation for said ring.

9. The apparatus of claim 1, wherein said gradually tapered wider end is tapered only to a section where said support component is disposed around said actuation body.

10. The apparatus of claim 1, wherein said actuation body is slightly indented in areas where said support component is disposed around said actuation body to provide a better fit.

11. The apparatus of claim 1, wherein said actuation body is comprised of metal or metal compounds.

12. The apparatus of claim 1, wherein said drive shell and said expanding member are comprised of metal or metal compounds.

13. The apparatus of claim 1, wherein said first support component is comprised of metal or metal compounds.

14. The apparatus of claim 8, wherein said rotation guard is a pin.

15. An actuation mechanism comprising:
a conical wedge drive screw received at one end by a drive nut and on an opposing end by expanding split ring;
said opposing end of said conical wedge drive screw having a tapered conical shape such said base of said cone is placed outwardly;
a first support component disposed around said conical wedge drive screw between said expanding split ring and said conical wedge drive nut around tip of said cone or said cone shaped end;
said drive nut having means to drive said conical wedge drive screw from a first position to a second position such that said conical end makes a looser or tighter fit with said expanding split ring;
a rotation guard disposed in said split of said expanding split ring and in contact with said conical wedge drive screw as to confine rotational movement of said conical wedge drive screw selectively.

16. The actuation mechanism of claim 15, wherein said expanding split ring is received by a receiving socket attached to a second support component.

17. The actuation mechanism of claim 16, wherein said actuation mechanism and said receiving socket and said second support component are fixably attached to different respective surfaces such that once said actuation mechanism is received by said receiving docket, different respective surfaces are fixably attached to one another.

18. The actuation mechanism of claim 17, wherein said mechanism is utilized in a computing system environment to fixably attach computer components housed on a plurality of boards to a housing frame.

* * * * *

UNITED STATES PATENT AND TRADEMARK OFFICE
CERTIFICATE OF CORRECTION

PATENT NO. : 7,646,609 B2  Page 1 of 1
APPLICATION NO. : 11/407020
DATED : January 12, 2010
INVENTOR(S) : Corrado et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Sixteenth Day of November, 2010

David J. Kappos
*Director of the United States Patent and Trademark Office*